(12) United States Patent
Esprimont et al.

(10) Patent No.: US 7,220,050 B2
(45) Date of Patent: May 22, 2007

(54) METHOD USING FLUX SENSORS TO DETERMINE THE OUTPUT OF A THERMAL REACTION WITHIN A HOUSING AND DEVICE FOR CARRYING OUT SUCH A METHOD

(75) Inventors: Eric Alain Esprimont, Igny (FR); Thomas Antonio Esposito, Paris (FR)

(73) Assignee: Mettler-Toledo AG, Greifensee (CH)

( * ) Notice: Subject to any disclaimer, the term of this patent is extended or adjusted under 35 U.S.C. 154(b) by 118 days.

(21) Appl. No.: 10/517,528

(22) PCT Filed: Jun. 11, 2003

(86) PCT No.: PCT/FR03/01757

§ 371 (c)(1),
(2), (4) Date: Jul. 5, 2005

(87) PCT Pub. No.: WO03/106950

PCT Pub. Date: Dec. 24, 2003

(65) Prior Publication Data

US 2006/0165151 A1    Jul. 27, 2006

(30) Foreign Application Priority Data

Jun. 12, 2002   (FR)   ................................... 02 08069

(51) Int. Cl.
*G01K 17/06* (2006.01)
*G01K 17/20* (2006.01)
*G01N 25/40* (2006.01)
(52) U.S. Cl. .......................................... 374/29; 374/43
(58) Field of Classification Search .................... 374/29
See application file for complete search history.

(56) References Cited

U.S. PATENT DOCUMENTS

| | | | | |
|---|---|---|---|---|
| 4,244,216 A | * | 1/1981 | Dukelow | 374/39 |
| 4,623,263 A | * | 11/1986 | Barberi et al. | 374/33 |
| 4,741,209 A | | 5/1988 | McCulloch | |
| 5,174,655 A | | 12/1992 | Litz et al. | |
| 5,940,784 A | * | 8/1999 | El-Husayni | 702/130 |
| 6,370,939 B2 | * | 4/2002 | Smith et al. | 73/19.03 |
| 6,431,747 B1 | * | 8/2002 | Danley | 374/10 |
| 7,077,563 B2 | * | 7/2006 | Xiao et al. | 374/29 |
| 2006/0023766 A1 | * | 2/2006 | Padoy | 374/29 |

FOREIGN PATENT DOCUMENTS

EP    0 275 042    7/1988

* cited by examiner

*Primary Examiner*—Gail Verbitsky
(74) *Attorney, Agent, or Firm*—Westerman, Hattori, Daniels & Adrian, LLP.

(57) ABSTRACT

The method uses heat flux sensors to determine the exchange area A between a reagent and housing containing the reagent, with the aim of determining the characteristics of the housing and the thermal reaction studied. The flux sensors are arranged at the housing in contact and non-contact zones of the housing with the reagent, such as to continuously determine in real time the precise exchange surface between the housing and the reagent as a proportion of the measurements taken by each flux sensor and in such a manner as to determine the heat exchange coefficient U between the housing and the reagent from the exchange area A and a measurement of the temperature Tr of the reagent and the wall of the housing respectively, particularly when thermostatted, as in the case of the application to a calorimeter.

14 Claims, 1 Drawing Sheet

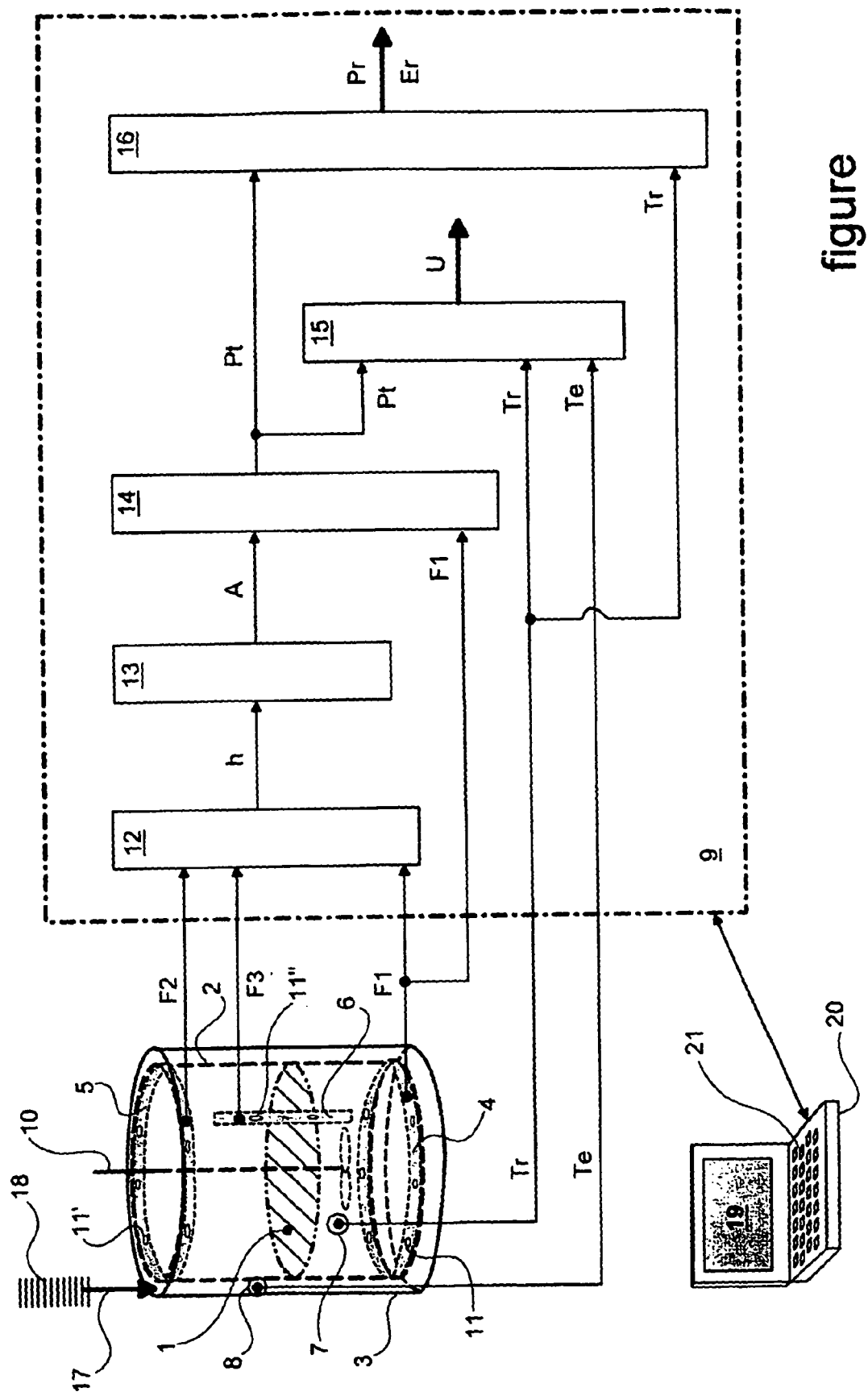
figure

METHOD USING FLUX SENSORS TO DETERMINE THE OUTPUT OF A THERMAL REACTION WITHIN A HOUSING AND DEVICE FOR CARRYING OUT SUCH A METHOD

The invention is in the field of metrology and more particularly in the field of measurements of heat amounts. Its object is a method to estimate the power of a thermal reaction inside a housing, such as that of a reactor of a calorimeter. Another of its objects is a device for carrying out such a method.

It is recalled that it is common to estimate and analyze thermal reactions occurring inside a housing. These thermal reactions are caused, for example, by chemical reactions of a reagent, or by the heat produced by biological reactions, such as those resulting from the activity of microorganisms, or by physical reactions, such as those resulting from crystallization or from the form transition of polymorphic substances, or finally by voluntary productions of energy, such as nuclear reactions.

More particularly, considering a calorimeter, the housing is placed in a thermally controlled environment, so as to maintain a reagent contained inside the housing at a desired temperature. This reagent is maintained in an agitated state, through the use of an agitation organ or by imparting a movement to the housing itself. The means for maintaining a desired temperature comprise, for example, a jacket surrounding the housing for the circulation of a thermostatted heat-exchanging fluid.

The evolution and analysis of the thermal reaction inside the housing aims more particularly at determining its power and the heat exchange coefficient between the wall of the housing and the reagent.

A first known technique comprises measuring internal and external temperatures of the housing by means of thermometers. The power of the thermal reaction takes into account the difference between the two measured temperatures, the exchange area and the heat exchange coefficient between the reagent and the wall of the housing. According to this technique, the exchange area is estimated approximately and the heat exchange coefficient is determined beforehand through calibration by plunging a heating electric resistance in the reagent. One may refer, for example, to U.S. Pat. No. 5,174,655 to Wilfried Litz et al.

A first drawback of this technique resides in the fact that the exchange area is taken into account arbitrarily by approximate estimation in accordance with the level of the reagent in a quiet state inside the housing. This results in an approximation detrimental to the reliability and exactness of the obtained result regarding the determination of the power of the thermal reaction.

A second drawback resides in the inadequate use of a means for heating the reagent before its agitation, with, either undesirable consequences on the physical-chemical characteristics of the reagent before the reaction under study, or the preliminary step of determining the coefficient by a specific calibration procedure.

A second known technique comprises using a resistance heating placed in the heat-transfer fluid circulating between the housing and its jacket. When the reaction under study is exothermic, the resistance heating produces less heat to maintain the reagent temperature constant. The power of the reaction is then estimated from the corresponding power reduction of the resistance heating. One may refer, for example, to U.S. Pat. No. 4,130,016 to Lynn C. Walker.

A first major drawback of this technique is that it is not applicable to endothermic reactions.

A second drawback resides in the thermal inertia of the housing against a possible analysis of fast and/or large amplitude thermal variations.

A third technique comprises proceeding to a thermal balance in the circulation zone of the heat-transfer fluid. To this effect, for example, a condenser is used in which the heat-transfer fluid condenses after heating. The measurement of the amount of fluid condensed makes it possible to determine the power of the thermal reaction. One may refer, for example, to European Patent EP 0275042 (Westinghouse Electric Corporation).

A drawback of this technique resides in the imprecision of the analysis of the thermal reaction inside the housing, estimated through the heat-transfer fluid, which incorporates approximations in measurements, in particular with respect to cumulated thermal losses between the housing and the means used to obtain the thermal balance.

In addition, here also, it results in an approximation detrimental to the reliability and exactness of the obtained result regarding the determination of the power of the thermal reaction.

The general aim of the present invention is to propose a method to estimate continuously, in real time, in a reliable and precise manner, the power of the thermal reaction inside a housing and the heat exchange coefficient between the reagent and this housing. Another aim of the invention is to propose a device to carry out this method.

In a general manner, the inventive thought process of the present invention has comprised proposing a method and its device for carrying it out to determine in a precise and reliable manner, in real time and continuously, the exchange area between the reagent and the housing, so as to finally make it possible to analyze in the same conditions the characteristics of the housing and of the thermal reaction under study.

This thought process has more particularly comprised in abandoning the habits used in the field, and in using heat flux sensors to determine in a precise, reliable manner, continuously and in real time, the exchange area between the reagent and the housing.

It results from this thought process that, starting from the use of simple means constituted by heat flux sensors, it is made possible to analyze a thermal reaction, either endothermic or exothermic, and reactions during which the physical-chemical properties of the reagent are likely to evolve rapidly and/or with important amplitudes.

In addition, it is made possible to analyze, continuously and in real time, a thermal reaction inside a housing with variations caused voluntarily to the temperature of the reagent, so as to study its evolution.

Thanks to such an unusual exploitation of the heat flux sensors, such as thermopiles providing logical data in voltage, it is made possible to obtain reliable measurements of heat flux through the wall of the housing, which makes it possible to calculate in a precise manner, continuously and in real time, with the use of automated digital computing means, firstly, the level of reagent inside the housing, secondly, the exchange area between the reagent and the wall of the housing, then the thermal power transmitted by the housing, and the heat exchange coefficient between the reagent and the wall of the housing, and lastly, the power and energy of the thermal reaction.

Another advantageous result of the invention will be noted, which resides in the absence of a preliminary calibration, as in the prior art, for the means used to carry out the method of the invention, i.e., the sensors for measuring the heat flux.

Beyond calorimetry, a need has appeared which resides in the precise and reliable knowledge, continuously and in real time, of the level of a liquid contained in a housing, which may be assimilated to a reagent of the type discussed above as far as its thermal evolution is concerned.

Another result attained by the present invention is to propose a method and its device for carrying it out which make it possible to measure, between two given instants $t_0$ and $t_1$, the distance variation, following a thermal reaction, considered between any two points of a reagent contained in the housing at the time $t_0$ and $t_1$.

Particular applications of the implementation of the method of the invention comprise in particular measuring the spontaneous variation of the actual level h of a reagent contained in a housing, in particular a security threshold, following natural variations or variations triggered by the environment outside this housing, such as a storage tank of a delicate product, or also the dilatometry of the material.

According to the present invention, it is proposed a method for determining an exchange area A between a reagent and the wall of a housing containing this reagent, in order to determine in particular the power $P_r$ of a thermal reaction inside the housing and the heat exchange coefficient U between the reagent and the housing wall.

According to a first aspect of the invention, the method proposed comprises in measuring a first heat flux $F_1$ per surface unit selected in a zone of the wall in secure contact with the reagent, measuring a second heat flux $F_2$ per surface unit selected in a zone of the wall in secure absence of contact with the reagent, measuring a third heat flux $F_3$ per surface unit selected in a zone of the wall comprising in a continuous overlapping manner both a zone of the wall in secure contact with the reagent next to a zone of the wall in secure absence of contact with the reagent, and then calculating the actual level h of the reagent inside the housing, based on proportions of the measurements of the first, second, and third heat flux which have been carried out.

These dispositions are such that, from the calculated actual level h of the reagent, and, with respect to any given geometry of the housing, the actual exchange area A between the reagent and the wall of the housing containing this reagent can be determined, continuously and in real time.

According to another aspect of the method proposed by the invention, the power $P_t$ transmitted by the housing can be determined by measuring the first heat flux $F_1$ per surface unit and by determining the said exchange area A between the reagent and the wall of the housing, preferentially by the method discussed above with respect to a first aspect of the invention.

These dispositions are such that the power $P_t$ transmitted by the housing can be calculated continuously and in real time, with a precision and a reliability preferentially derived from those of the exchange area A, starting from the measurement of the first heat flux $F_1$ per surface unit, scaled to the totality of the exchange area A between the reagent A and the wall of the housing.

Starting from the reliable data collected by the method of the invention, it is next proposed, in a secondary step, to determine the heat exchange coefficient U between the reagent and the wall of the housing by measuring the temperature $T_r$ of the reagent and the temperature $T_e$ of the wall of the housing, by determining the actual exchange area A between the reagent and the wall of the housing, and by calculating the power $P_t$ transmitted by the housing.

These dispositions are such that the heat exchange coefficient U between the reagent and the wall of the housing can be calculated continuously and in real time, with a precision and a reliability obtained from those of the exchange area A, preferentially determined by the general method of the invention.

It will be understood that the heat exchange coefficient U between the reagent and the wall of the housing is then calculated in a manner known to the person of the art, based on the power $P_t$ transmitted by the housing, the heat exchange area A between the reagent and the wall of the housing, and the temperature difference between the temperature of the reagent and the temperature of the wall of the housing.

It will be noted, however, that an advantageous result specific to the implementation of the method of the invention resides in the direct determination of the heat exchange coefficient between the reagent and the wall of the housing, without preliminary step likely to disturb the reagent.

Another result of the dispositions of the invention is a monitoring, continuously and in real time, of the modifications of the physical-chemical properties of the reagent, such as, for example, an increase in its viscosity during the thermal reaction under study.

Finally, another result of these dispositions is the possibility of simulating with a great precision thermal reactions in reactors of a larger size.

Starting from the reliable data collected by the method of the invention, the power $P_r$ of the reaction is determined by measuring the evolution of the reagent temperature during the time of the reaction, by determining the power $P_t$ transmitted by the housing, and by estimating the thermal losses of the housing. These thermal losses, commonly referred to as "heat losses through the reactor head assembly", are elements known to the person of the art.

These dispositions are such that the power $P_r$ of the reaction can be calculated, continuously and in real time, with a precision and a reliability obtained from those of the exchange area A, preferentially determined by the general method of the invention.

It will be understood that the power $P_r$ of the reaction can be calculated in the manner known to the person of the art, from the mass and the physical-chemical characteristics of the reagent, the evolution of the temperature $T_r$ of the reagent as a function of time, the power $P_t$ transmitted by the housing, and the thermal losses of the housing.

It will be understood also that the energy of the reaction is obtained, in the manner known to the person of the art, by integration as a function of time of the power of the reaction measured continuously during the thermal reaction.

According still to the present invention, with respect to a device for carrying out the method proposed in its generality, this device comprises:

a first housing designed to receive the reagent, a first heat flux sensor for measuring the first heat flux $F_1$ per surface unit, this sensor being arranged at the external wall of the housing in a zone opposed to its internal face, in secure contact with the reagent, a second heat flux sensor for measuring the second heat flux $F_2$ per surface unit, this sensor being arranged at the external wall of the housing in a zone opposed to the internal face, in secure absence of contact with the reagent, a third heat flux sensor for measuring the third heat flux $F_3$ per surface unit, this sensor being arranged at the external wall of the housing in a zone opposed to its internal face, both in presence and in absence of contact with the reagent.

Such a device comprises also advantageously first electronic means for calculating the level h of the reagent from logical voltage data provided by the first, second, and third heat flux sensors, and second electronic means for calculating the actual exchange area A between the reagent and the wall of the housing, from logical data provided by the first electronic means and from the first memory means of the geometric characteristics of the housing, preliminarily captured.

According to a particular organization of the device of the invention in calorimetry, this device also comprises a jacket surrounding the housing for the circulation of a fluid around this housing, the fluid being thermostatted by heat-producing means, so as to maintain the housing at a desired temperature.

Still according to this organization, the device of the invention comprises preferentially a first temperature sensor placed inside the housing to measure the temperature $T_r$ of the reagent, and a second temperature sensor placed inside the envelope to measure the temperature $T_e$ of the wall of the housing, obtained in particular from the measurement of the temperature of the heat-transfer fluid inside the envelope, in the manner known to the person of the art.

According to a preferred embodiment, the device of the invention comprises additionally third electronic means for calculating the power $P_t$ transmitted by the housing and fourth electronic means for calculating the heat exchange coefficient U between the reagent and the wall of the housing, from logical data provided by the second electronic calculation means, and from the logical data provided by the first and second temperature sensors.

Preferentially also, the device of the invention comprises fifth electronic means for calculating the power $P_r$ of the thermal reaction from logical data provided by the third electronic calculation means and by the first temperature sensor.

It will also be noted that the first, second, and third heat flux sensors constitute advantageously general means for determining continuously the level h of a reagent inside the housing, in association with the first calculation means.

It will be noted further that the first, second, third, fourth, and fifth electronic calculation means are advantageously grouped in general memory and electronic calculator means.

It will be noted, finally, that the device of the invention comprises in particular a calculator comprising general memory and electronic calculation means, means for displaying the various measured and calculated logical data, such as screen, printer, or the like, and means for capturing data and controlling general calculation means, such as a keyboard or the like.

The present invention will be better understood and details regarding the invention will be apparent from the description below of a preferred embodiment, made in reference to the only FIGURE of the annexed sheet of drawings, which illustrates schematically an example of embodiment of a device carrying out a general method of the invention.

On the FIGURE, a device proposed by the invention comprises in its generality:

a calorimeter, comprising a housing 2, a jacket 3 arranged around this housing 2 for the circulation of a fluid 17, and means 18 for producing heat in the fluid 17 to maintain the reagent at a desired temperature, heat flux sensors 4,5,6 which equip the housing 2, general memory and electronic calculation means 9.

The above-mentioned flux sensors 4,5,6 are comprised in particular of:

a first annular sensor 4, placed in contact with and around the external face of the wall of the housing 2, at the base of this housing, a second annular sensor 5, placed in contact with and around the external face of the wall of the housing 2, at the top of this housing, a third band-shaped sensor 6, placed in contact with and along a generatrix of the external face of the wall of the housing 2, so as to cover continuously zones of this housing in correspondence with zones of the internal face of the wall of the housing 2 respectively in contact and in absence of contact with the reagent 1.

Further, the housing 2 is equipped with a first temperature sensor 7 measuring the temperature $T_r$ of the reagent 1 and with a second temperature sensor 8 measuring the temperature $T_f$ of the fluid contained in the jacket 3, in order to know the temperature $T_e$ of the wall of the housing.

Each of these heat flux sensors 4,5,6 and temperature sensors 7,8 is connected to the general electronic calculation means 9.

It will be noted that the housing 2 is equipped in particular with means for agitating the reagent 1, in accordance with known dispositions usual in the field, such as an agitator 10, and with fixation means 11, 11', 11" of the flux sensors 4,5,6 on its wall, using, for example, hooks associated to elastic means.

This device makes it possible, advantageously:

in a first step, to determine, with the first electronic calculation means 12, the actual level h of the reagent, from the heat flux $F_1$, $F_2$, $F_3$ measured respectively by the first, second, and third flux sensors. It will be noted that this determination is obtained from the following formula:

$$F_3 = h.F_1 + (1-h).F_2$$

in a second step, to determine, with the second electronic calculation means 13, the exchange area A between the reagent 1 and the wall of the housing 2. For a cylindrical housing, such as the one shown on the FIGURE by way of example, this determination is obtained in particular from the following formula:

$$A = a + (2.\pi.R.c.(F_3 - F_2)/(F_1 - F_2))$$

a: exchange area of the circular base of the housing (in $m^2$)

R: radius of the cylinder forming the housing (in m)

c: total height of the vertical flux sensor (in m)

in a third step, to determined, with the third electronic calculation means 14, the power $P_t$ transmitted by the housing 2 from the heat exchange area A and the flux $F_1$. It will be noted that this determination is obtained in particular from the following formula $$P_t = A.F_1$$

in a fourth step, to determine, with the fourth electronic calculation means 15, the heat exchange coefficient U between the reagent 1 and the wall of the housing 2 from the power transmitted by the housing 2, the temperature $T_r$ of the reagent 1 and the temperature $T_e$ of the heat-transfer fluid contained in the envelope 3. It will be noted that this determination is obtained in particular from the following formula:

$$U=P_t/(A.(T_r-T_e))$$

in a fifth step, to determine, with the fifth electronic calculation means 16, the power $P_r$ of the thermal reaction under study from the power $P_t$ transmitted by the housing 2, the evolution of the temperature $T_r$ of the reagent 1 as a function of time, the mass m of the reagent, the calorific capacity $C_p$ of the reagent 1, and the thermal losses of the housing 2. It will be noted that this determination is obtained in particular form the following formula:

$$P_r = P_t + m.C_p.(dT_r/dt) + \text{losses}$$

The energy $E_r$ of the reaction is thus obtained through integration as a function of time of the power $P_r$ of the reaction.

It will be noted that the illustrated device comprises additionally a calculator 20 comprising general memory and electronic calculation means 9, display means such as a screen 19, a printer, and data capture and control means 21.

It will be noted also that the general memory and electronic calculation means 9 are organized in the form of software.

The invention claimed is:

1. Method for determining an exchange area A between a reagent and a wall of a housing containing this reagent, in order to determine in particular a power $P_r$ of a thermal reaction inside the housing and a heat exchange coefficient U between the reagent and the wall of the housing, comprising:

measuring a first heat flux $F_1$ per surface unit taken in a first zone of the wall in secure contact with the reagent, measuring a second heat flux $F_2$ per surface unit taken in a second zone of the wall in secure absence of contact with the reagent, measuring a third heat flux $F_3$ per surface unit taken in a third zone of the wall comprising, in a continuously overlapping manner, both a zone of the wall in secure contact with the reagent next to a zone of the wall in secure absence of contact with the reagent, calculating, based on proportions of the measurements of the first, second, and third heat flux which have been carried out, the actual level h of the reagent inside the housing, so that the actual exchange area A between the reagent and the wall of the housing containing this reagent can be determined continuously and in real time, based on the calculated actual level h of the reagent, and with respect to any given geometry of the housing.

2. Method according to claim 1, applied to the determination of the power $P_t$ transmitted by the housing, comprising:

measuring the first heat flux $F_1$ per surface unit, determining the exchange area A between the reagent and the wall of the housing, so that the power $P_t$ transmitted by the housing can be calculated, continuously and in real time, with a precision and a reliability derived from those of the exchange area A.

3. Method according to claim 2, applied to the determination of the heat exchange coefficient U between the reagent and the wall of the housing, comprising:

measuring the temperature $T_r$ of the reagent and the temperature $T_e$ of the wall of the housing, determining the actual exchange area A between the reagent and the wall of the housing, calculating the power $P_t$ transmitted by the housing, so that the heat exchange coefficient U between the reagent and the wall of the housing can be calculated continuously and in real time, with a precision and a reliability derived from those of the exchange area A.

4. Method according to claim 2, applied to the determination of the power $P_r$ of the reaction, comprising:

measuring the evolution of the temperature $T_r$ of the reagent as a function of the reaction time, determining the power $P_t$ transmitted by the housing, estimating the thermal losses of the housing, so that the power $P_r$ of the reaction can be calculated, continuously and in real time, with a precision and a reliability derived from those of the exchange area A.

5. Method according to claim 1, applied to the measurement of the variation of the level h of a reagent inside a housing, until a security threshold is reached.

6. Device for measuring an exchange area A between a reagent and a wall of a housing containing this reagent, comprising:

a housing designed to receive the reagent, a first heat flux sensor for measuring the first heat flux $F_1$ per surface unit, this heat flux sensor being arranged at the external wall of the housing in a zone opposed to a first zone of its internal face in secure contact with the reagent, a second heat flux sensor for measuring the second heat flux $F_2$ per surface unit, this heat flux sensor being arranged at the external wall of the housing in a zone opposed to a second zone of its internal face in secure absence of contact with the reagent, a third heat flux sensor for measuring the third heat flux $F_3$ per surface unit, this heat flux sensor being arranged at the external wall of the housing in a zone opposed to a third zone of its internal face, said third zone being both in presence and in absence of contact with the reagent.

7. Device according to claim 6, comprising first electronic means for calculating the level h of the reagent from logical voltage data provided by the first, second, and third flux sensors, and second electronic means for calculating the actual exchange area A between the reagent and the wall of the housing.

8. Device according to claim 6, applied to a calorimeter, comprising a jacket surrounding the housing for the circulation of a fluid around this housing, this fluid being thermostatted by heat-producing means, so as to maintain the housing at a desired temperature.

9. Device according to claim 8, comprising:

a first temperature sensor placed inside the housing to measure the temperature $T_r$ of the reagent, a second temperature sensor placed inside the jacket to measure the temperature $T_e$ of the wall of the housing from the temperature $T_f$ of the thermostatted heat-transfer fluid inside the jacket.

10. Device according to claim 9, comprising third electronic means for calculating the power $P_t$ transmitted by the housing and fourth electronic means for calculating the heat exchange coefficient U between the reagent and the wall of the housing, from the logical data provided by the second electronic calculation means and from the logical data provided by the first and second temperature sensors.

11. Device according to claim 10, comprising fifth electronic means for calculating the power $P_r$ of the thermal reaction from the logical data provided by the third electronic calculation means and by the first temperature sensor.

12. Device according to claim 6,
wherein the first, second, and third heat flux sensors constitute general means for determining continuously the level h of a reagent inside the housing, in association with the first calculation means.

13. Device according to claim 7, comprising third electronic means for calculating the power $P_t$ transmitted by the housing, fourth electronic means for calculating the heat exchange coefficient U between the reagent and the wall of the housing, from the logical data provided by the second electronic calculation means and from the logical data provided by the first and second temperature sensors, and fifth electronic means for calculating the power $P_r$ of the thermal reaction from the logical data provided by the third electronic calculation means and by the first temperature sensor,
wherein the first, second, third, fourth, and fifth electronic calculation means are grouped in general memory and electronic calculation means.

14. Device according to claim 13, comprising a calculator comprising:
general memory and electronic calculation means,
means for displaying various measured and calculated logical data,
means for capturing data and controlling the general memory and electronic calculation means.

* * * * *